(12) United States Patent
Chernenko et al.

(10) Patent No.: US 12,067,370 B2
(45) Date of Patent: Aug. 20, 2024

(54) DETECTION OF ABBREVIATION AND MAPPING TO FULL ORIGINAL TERM

(71) Applicant: SAP SE, Walldorf (DE)

(72) Inventors: Tetyana Chernenko, Heidelberg (DE); Anton Snitko, Edingen-Neckarhausen (DE); Jens Scharnbacher, Walldorf (DE); Michail Vasiltschenko, Schriesheim (DE)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 17/342,114

(22) Filed: Jun. 8, 2021

(65) Prior Publication Data

US 2022/0391601 A1 Dec. 8, 2022

(51) Int. Cl.
*G06F 40/30* (2020.01)
*G06F 16/2458* (2019.01)
*G06F 40/274* (2020.01)
*G06F 40/44* (2020.01)
*G06F 40/55* (2020.01)
*G06F 40/58* (2020.01)

(52) U.S. Cl.
CPC .......... *G06F 40/58* (2020.01); *G06F 16/2468* (2019.01); *G06F 40/274* (2020.01); *G06F 40/55* (2020.01)

(58) Field of Classification Search
None
See application file for complete search history.

(56) References Cited

U.S. PATENT DOCUMENTS

| | | | | |
|---|---|---|---|---|
| 6,157,956 A * | 12/2000 | Jensen | ................ | G06F 11/3068 710/65 |
| 6,279,018 B1 * | 8/2001 | Kudrolli | ................. | G06F 40/40 704/9 |
| 7,236,923 B1 * | 6/2007 | Gupta | ................... | G06F 40/284 704/7 |
| 7,827,125 B1 * | 11/2010 | Rennison | .............. | G06F 16/906 706/14 |
| 10,747,962 B1 * | 8/2020 | Fuerstenau | .............. | G06N 3/08 |

(Continued)

*Primary Examiner* — Lamont M Spooner
(74) *Attorney, Agent, or Firm* — Fountainhead Law Group, PC

(57) ABSTRACT

Translation capability for language processing determines an existence of an abbreviation, followed by non-exact matching to map the abbreviation to the original full term. A received string in a source language is provided as input to a translation service. Translation proposals in a different target language are received back. A ruleset (considering factors, e.g., camel case format, the presence of a concluding period, and/or consecutive consonants) is applied to generate abbreviation candidates from the translation proposals. Non-exact matching (referencing e.g., a comparison metric) may then be used to map the abbreviation candidates to text strings of their original full terms. A mapping of the abbreviation to the text string of the original full term is stored in a translation database comprising linguistic data. Embodiments leverage existing resources (e.g., translation service, non-exact matching) to reduce effort and expense of accurately identifying abbreviations and then mapping them to their full original terms.

17 Claims, 10 Drawing Sheets

(56) References Cited

U.S. PATENT DOCUMENTS

| | | | | |
|---|---|---|---|---|
| 2001/0042172 | A1* | 11/2001 | Duesterwald | G06F 9/45504 712/209 |
| 2006/0174196 | A1* | 8/2006 | Zhang | G06F 9/454 715/236 |
| 2006/0217957 | A1* | 9/2006 | Sato | G06F 40/53 704/2 |
| 2009/0125477 | A1* | 5/2009 | Lu | G06F 16/3343 |
| 2009/0182554 | A1* | 7/2009 | Abraham | G06F 40/279 704/9 |
| 2011/0010353 | A1* | 1/2011 | Wei | G06F 16/3338 707/706 |
| 2012/0262461 | A1* | 10/2012 | Fisher | G06F 40/274 345/467 |
| 2013/0124564 | A1* | 5/2013 | Oztekin | G06Q 10/02 707/E17.014 |
| 2013/0262080 | A1* | 10/2013 | Marciano | G06F 40/47 704/3 |
| 2013/0262994 | A1* | 10/2013 | McMaster | G06F 40/274 715/261 |
| 2013/0332454 | A1* | 12/2013 | Stuhec | G06F 16/211 707/730 |
| 2015/0169582 | A1* | 6/2015 | Jain | G06F 16/3332 707/748 |
| 2018/0314688 | A1* | 11/2018 | Snitko | G06F 9/454 |
| 2020/0012724 | A1* | 1/2020 | Kawatake | G10L 13/033 |
| 2020/0026763 | A1* | 1/2020 | Kurabayashi | G06F 40/58 |
| 2020/0184278 | A1* | 6/2020 | Zadeh | G06N 3/044 |
| 2020/0233927 | A1* | 7/2020 | Berger | G06F 40/216 |
| 2020/0394567 | A1* | 12/2020 | Choe | G06N 5/01 |
| 2021/0064704 | A1* | 3/2021 | Yang | G06F 40/58 |
| 2022/0067571 | A1* | 3/2022 | Lagerling | G06N 20/00 |
| 2022/0207244 | A1* | 6/2022 | Dvorkovich | G06F 40/55 |

* cited by examiner

FIG. 6

```
"targetText": "Übernehmen",
"score": 1.000,
"usageCount": 1027,

"targetText": "Anwenden",
"score": 1.000,
"usageCount": 675,

"targetText": "Beantragen",
"score": 1.000,
"usageCount": 22,

"targetText": "Übern",
"score": 1.000,
"usageCount": 13,

"targetText": "Apply",
"score": 1.000,
"usageCount": 12,

"targetText": "Bewerben",
"score": 1.000,
"usageCount": 7,

"targetText": "Zuweisen",
"score": 1.000,
"usageCount": 5,

"targetText": "OK",
  "score": 1.000,
"usageCount": 3,

"targetText": "Übn.",
"score": 1.000,
"usageCount": 1,

"targetText": "Anwdn",
"score": 1.000,
"usageCount": 1
```

| "targetText": "Übernehmen", | Not an abbreviation | correct |
| --- | --- | --- |
| "score": 1.000, | | |
| "usageCount": 1027, | | |
| | | |
| "targetText": "Anwenden", | Not an abbreviation | correct |
| "score": 1.000, | | |
| "usageCount": 675, | | |
| | | |
| "targetText": "Beantragen", | Not an abbreviation | correct |
| "score": 1.000, | | |
| "usageCount": 22, | | |
| | | |
| "targetText": "Übern", | Not an abbreviation | false |
| "score": 1.000, | | |
| "usageCount": 13, | | |
| | | |
| "targetText": "Apply", | Not an abbreviation | correct |
| "score": 1.000, | | |
| "usageCount": 12, | | |
| | | |
| "targetText": "Bewerben", | Not an abbreviation | correct |
| "score": 1.000, | | |
| "usageCount": 7, | | |
| | | |
| "targetText": "Zuweisen", | Not an abbreviation | correct |
| "score": 1.000, | | |
| "usageCount": 5, | | |
| | | |
| "targetText": "OK", | Not an abbreviation | correct, as such abbreviations must not be mapped |
| "score": 1.000, | | |
| "usageCount": 3, | | |
| | | |
| "targetText": "Übn.", | Probable abbreviation | correct |
| "score": 1.000, | | |
| "usageCount": 1, | | |
| | | |
| "targetText": "Anwdn", | Probable abbreviation | correct |
| "score": 1.000, | | |
| "usageCount": 1 | | |

FIG. 7

DETECTION OF ABBREVIATION AND MAPPING TO FULL ORIGINAL TERM

BACKGROUND

Unless otherwise indicated herein, the approaches described in this section are not prior art to the claims in this application and are not admitted to be prior art by inclusion in this section.

Language processing finds usage in a wide variety of computer-implemented functionality. Hence, rapid and accurate recognition of the meaning of incoming text is an important goal for system operation.

The existence and use of abbreviations, can pose a difficulty for language processing. The occurrence of such abbreviations may be a result of a particular user interface (e.g., arbitrarily limiting the size of a user input field to a maximum number of characters). Moreover, the prevalence and evolution of abbreviations specific to a local environment (e.g., a particular company or industry) can exacerbate the challenge of properly handling abbreviations in the course of language processing.

SUMMARY

Embodiments utilize a human language translation capability for language processing to determine an existence of an abbreviation candidate, followed by non-exact matching to map the abbreviation candidate to its original full term. A received string in a source language is provided as input to a translation service. Translation proposals in a different target language are received back. A ruleset (considering factors such as camel case format, the presence of a concluding period, and/or consecutive consonants) is applied to generate abbreviation candidates from the translation proposals. Non-exact matching (referencing e.g., a comparison metric) may then be used to map the abbreviation candidates to text strings corresponding to their original full terms. A mapping of the abbreviation to the text string of the original full term is stored in a translation database comprising linguistic data. Embodiments leverage existing resources (e.g., translation service, non-exact matching) to reduce effort and expense of accurately identifying abbreviations and then mapping them to their full original terms.

The following detailed description and accompanying drawings provide a better understanding of the nature and advantages of various embodiments.

BRIEF DESCRIPTION OF THE DRAWINGS

FIG. 6 shows list of translation proposals.

FIG. 7 shows a list of translation proposals evaluated according to a ruleset.

DETAILED DESCRIPTION

Described herein are methods and apparatuses that perform detection of abbreviations, and mapping of the abbreviations to their original full terms in the course of language processing. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
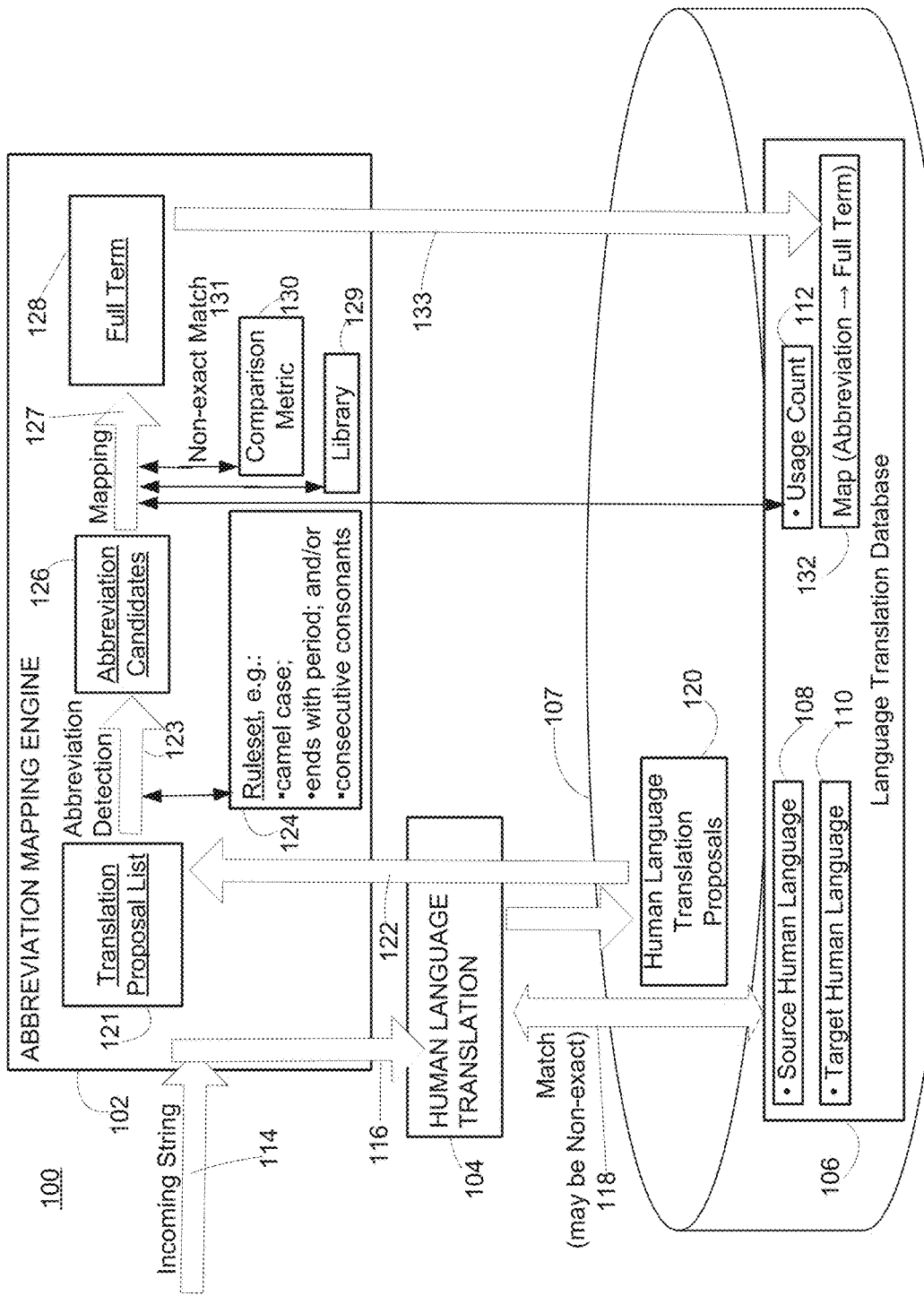
FIG. 1 shows a simplified diagram of a system according to an embodiment.

FIG. 1 shows a simplified view of an example system that is configured to implement abbreviation detection and mapping according to an embodiment. Specifically, system 100 comprises an abbreviation mapping engine 102 that is in communication with a human language translation service 104.

The human language translation service stores linguistic data in a language translation database 106. That database is stored in a non-transitory computer readable storage medium 107, and may include source human language information 108, target human language information 110, and usage count information 112.

The abbreviation mapping engine receives an incoming string 114, which may include an abbreviation. Such an abbreviation may be the result of a maximum character size imposed on an input field by a user interface.

The abbreviation mapping engine in turn provides 116 the string as input to the human language translation service. Such a human language translation service may already be existing and/or provided by an outside source.

The human language translation service processes the string to perform matching 118 with the linguistic data stored in the database. According to some embodiments, this matching may be exact in nature.

According to other embodiments, this matching may be non-exact in nature. In such embodiments, a similarity score may be calculated to reflect the closeness of the matching.

As a result of the matching, translation proposals 120 are generated and stored. Next, a list of translation proposals 121 (limited, e.g., by a maximum number of entries) is uploaded 122 to the abbreviation mapping engine.

Then, as part of an abbreviation detection phase 123 the abbreviation mapping engine applies a ruleset 124 to the list of translation proposals in order generate a subset of abbreviation candidates 126. This ruleset may consider factors such as the existence of camel case, the presence of a concluding period, and/or the occurrence of multiple consonants in series.

The abbreviation mapping engine then proceeds to perform a mapping 127 of the abbreviation candidate to a text string corresponding to an original full term 128. With reference to the usage count, a library 129 (e.g., a fuzzy search library), and a comparison metric 130, the engine employs non-exact matching 131 in order to compare the abbreviation candidates to text strings which may correspond to the full original term for the abbreviation. According to particular embodiments, this non-exact matching may involve calculating the comparison metric in the form of an edit distance (e.g., a Levenshtein distance).

In addition to non-exact matching, the abbreviation candidate-to-text string mapping may consider other factors. One such factor may be the length of the text string as compared to the lengths of other mapped text strings.

Once the text string corresponding the original full term has been mapped from the abbreviation candidates, the resulting map 132 is then stored 133 in the database for future reference. This can occur, for example, during subsequent machine learning performed upon the stored linguistic data.

Figure 2:
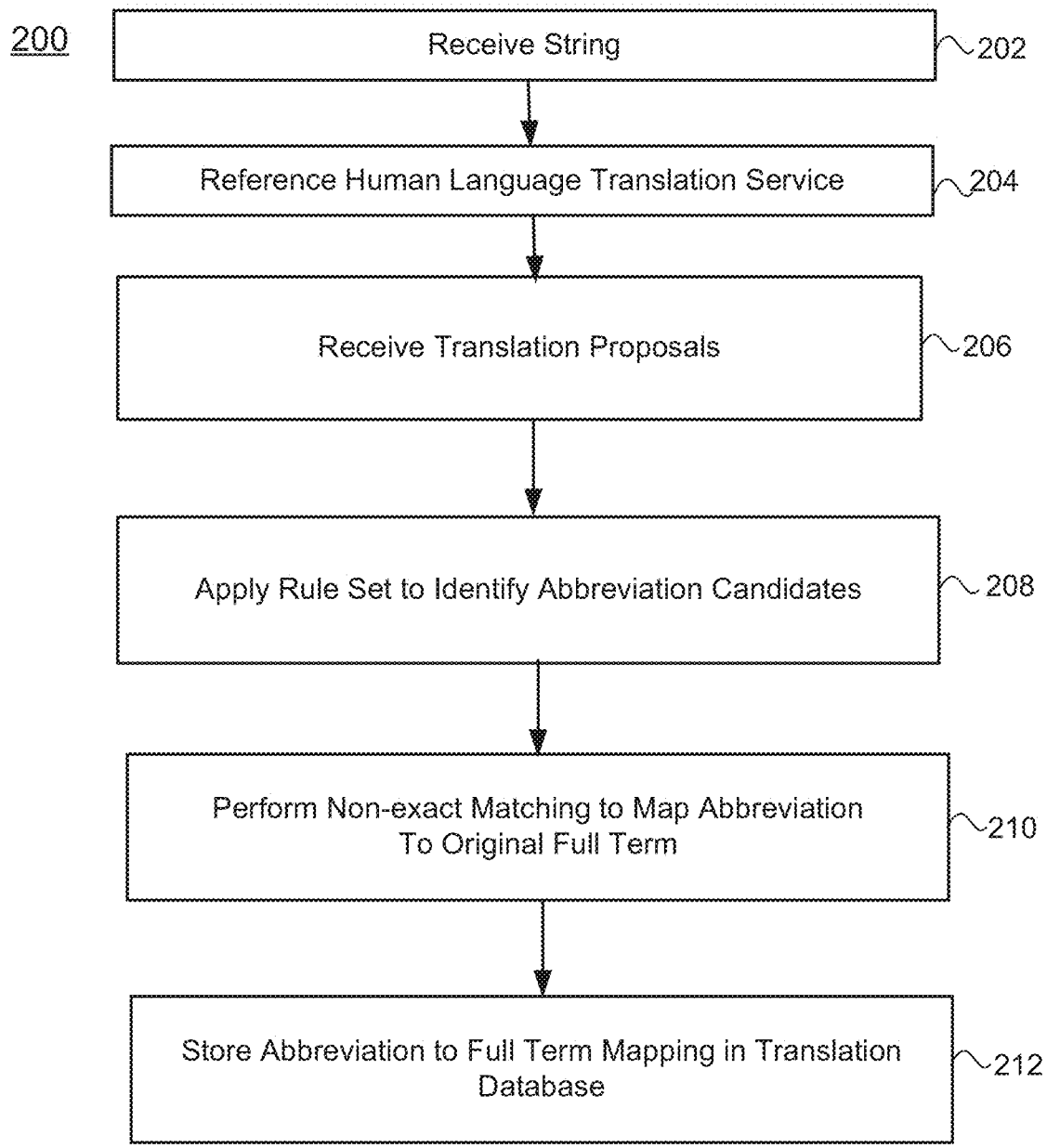
FIG. 2 shows a simplified flow diagram of a method according to an embodiment.

FIG. 2 is a flow diagram of a method 200 according to an embodiment. At 202, an incoming string is received.

At 204, a human language translation service is referenced with the string. At 206, a list of translation proposals is received from the language translation service.

At 208, a rule set is applied to the translation proposals to identify abbreviation candidates. Such a rule set can reference camel case format, existence of a concluding period, and/or appearance of consecutive consonants.

At 210, non-exact matching is between the abbreviation candidates and text strings is used map the abbreviations to the original full terms. Based upon such non-exact matching, at 212 the map between the abbreviation and the text of the corresponding original full term is saved in a database for future reference.

Systems and methods for implementing abbreviation detection and mapping according to embodiments, may offer one or more benefits. In particular, it is desirable to reuse linguistic data previously gathered in real-world scenarios.

This linguistic data may be reused in translation processes, reducing the costs for translation. Such data may also be used by different linguistic processing such as Retrieval or Neural Machine Translation.

Owing to the existence of unrecognized abbreviations, such collected linguistic data may suffer from inconsistency and low quality. This can limit performance in reuse of the linguistic data or even preclude it being reused at all.

The effective recognition of abbreviations can be complicated by several factors. For example, linguistic data may be gathered over long time periods and include antiquated abbreviations. Moreover, linguistic data may come from different queries (different domains, purchased companies) and include industry-specific or company-specific abbreviations.

Linguistic data can include large numbers of (oddly-appearing) abbreviations created to comply with text field size restrictions. Abbreviations may also be used to represent less well-known terms, camel case, reduced vowels, use of only the first letters of the token, use (or not) of a dot mark, and others.

Thus, abbreviation determination and mapping performed according to embodiments may enrich existing gathered linguistic data for use by training procedures. Such abbreviation recognition may be particularly important for uncommon industry-specific strings, where the abbreviation is the only existing translation proposal for the given domain.

Details regarding implementation of abbreviation detection and mapping according to some embodiments, are now provided in connection with the following example.

Example

Figure 3:
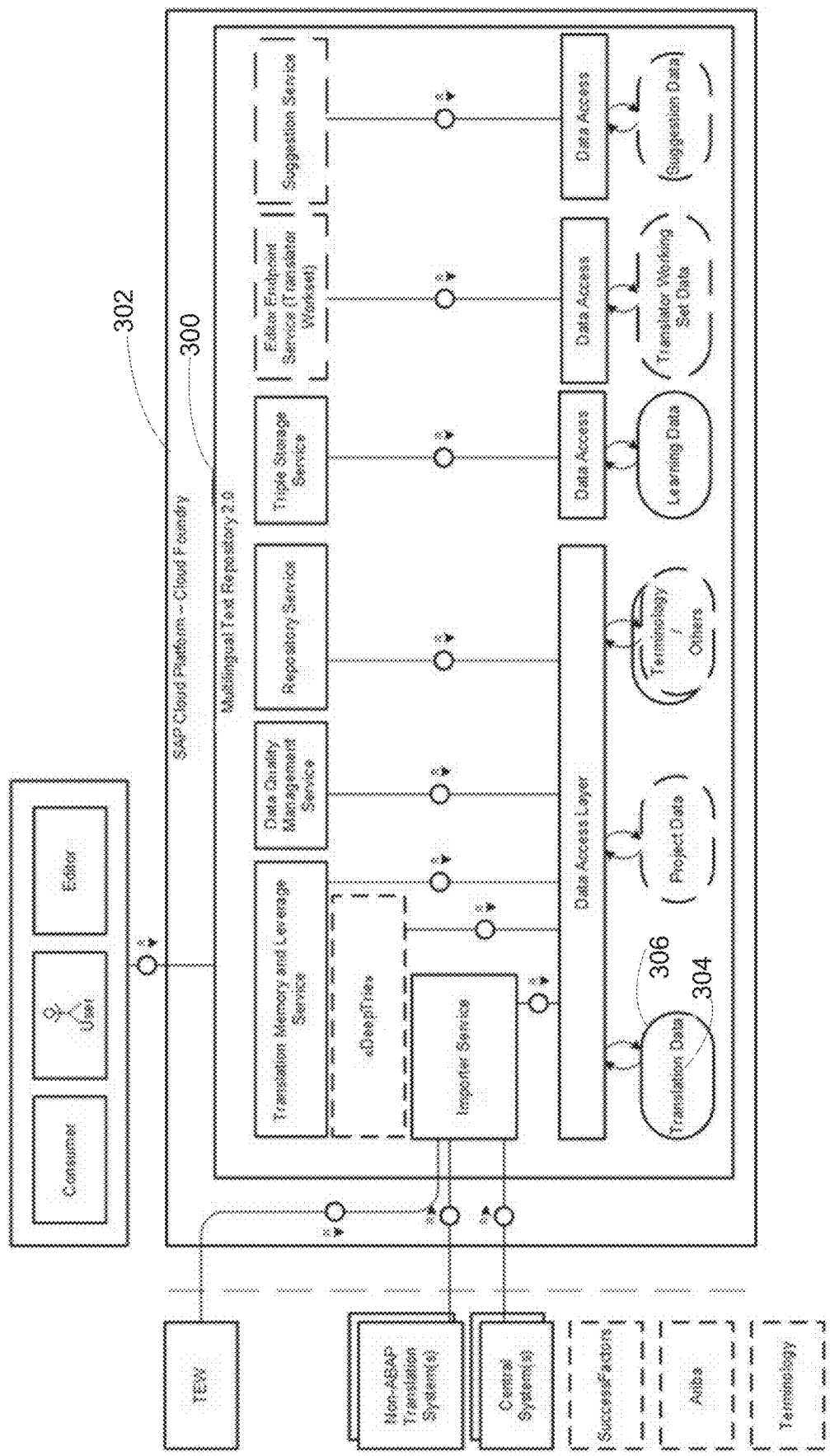
FIG. 3 is a simplified block diagram illustrating an exemplary language processing system hosted on the cloud.

This exemplary embodiment of abbreviation detection and mapping, is now described in connection with the Multilingual Text Repository (MLTR) 2.0 as hosted by the Cloud Foundry cloud system, both of which are available from SAP SE of Walldorf, Germany. FIG. 3 is a simplified block diagram illustrating the SAP MLTR 2.0 300, hosted on the cloud foundry cloud system 302.

Figure 4A:
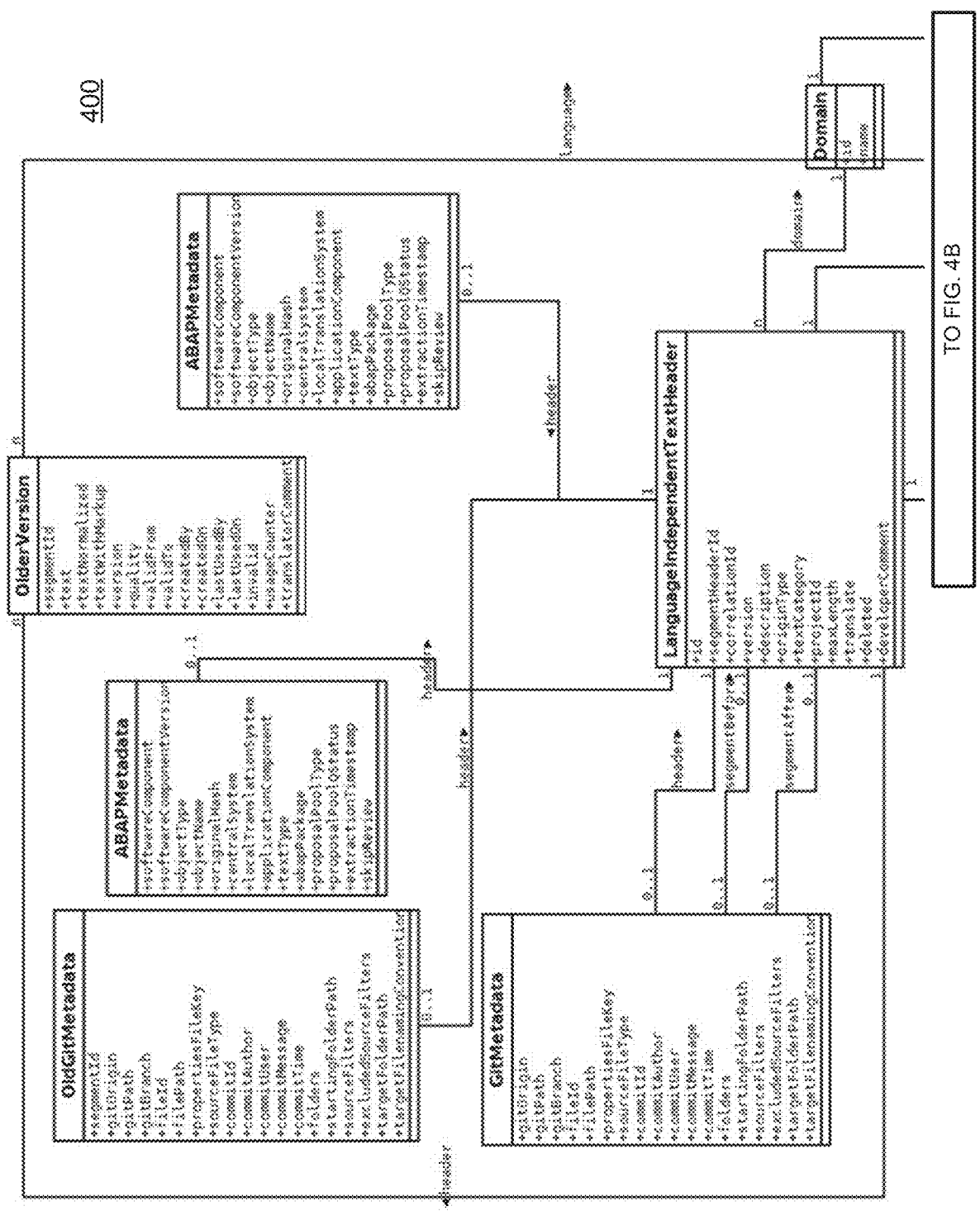
FIGS. 4A-4B show details of an exemplary database schema.
Figure 4B:
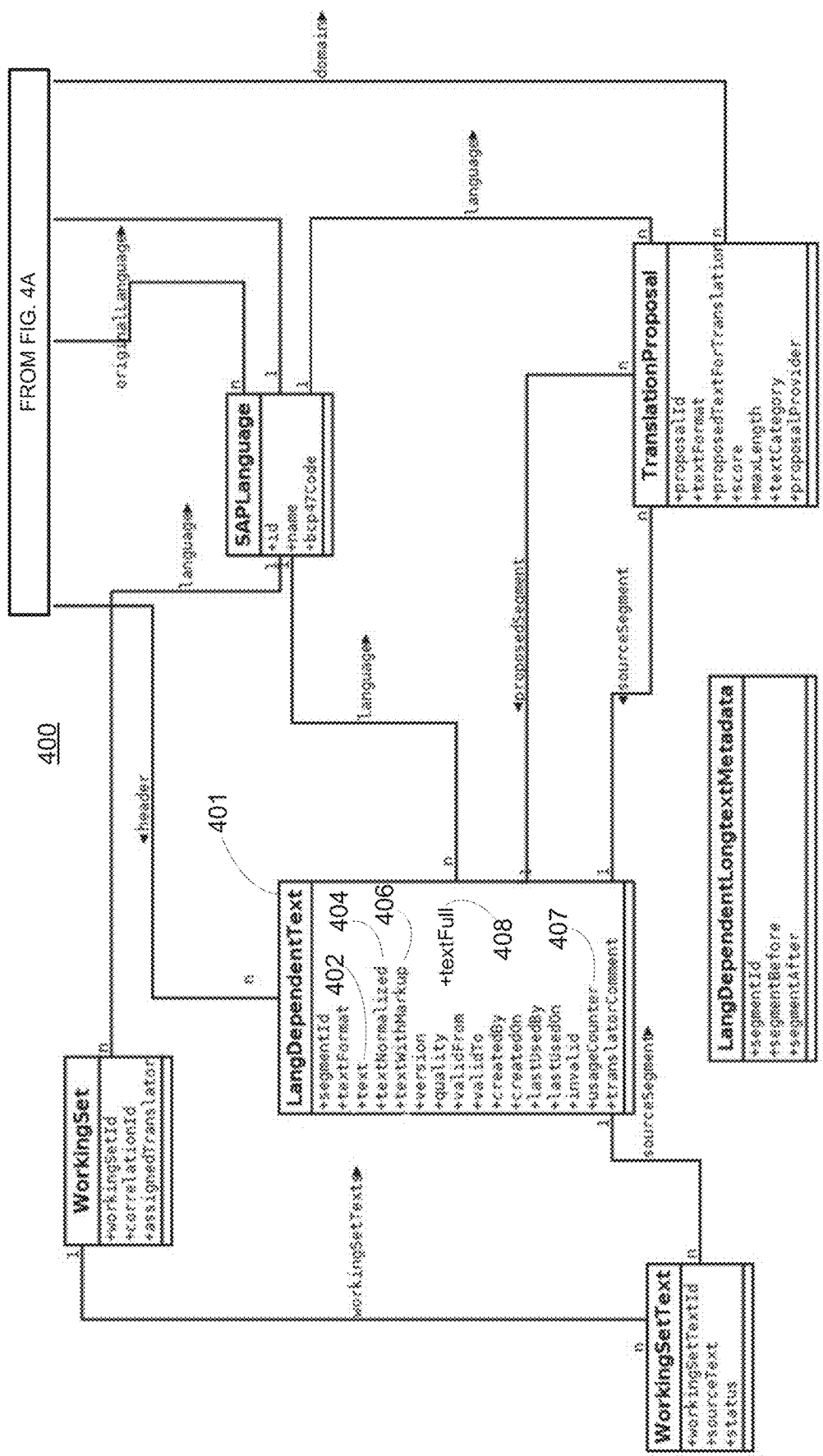

The MLTR includes translation data 304 stored within database 306. FIGS. 4A-4B show details of a schema 400 storing that translation data in at least the following four database columns in the table LangDependentText 401:

text 402,
textNormalized 404,
textWithMarkup 406,
usageCounter 407.

As a side note, some of the database column names exhibit a camel case format. That is, the first character of the column name appears in lower case, while an internal character of the column name appears in upper case. As described below, incoming strings exhibiting camel case can be one relevant indication of the existence of an abbreviation.

The column "text" contains raw texts, which may include abbreviations. The column "textWithMarkup" contains text with XLIFF 2.1 markup.

The column "textNormalized" can be purposed for possible data changes for the better performance of a retrieval procedure, e.g., as implemented in connection with a Suggestion Service.

The column "usageCounter" maintains a count of past acceptance of a proposed translation by system users. Such user acceptance of proposed translated term, can offer a gauge of the accuracy of that translation.

This exemplary embodiment employs a technique for mapping abbreviations to a full, unshortened term, without having to resort to the effort and expense of creating vocabularies that explicitly include abbreviations in order to find the correct replacements. Certain embodiments are based upon a mix of possibilities of retrieval procedures on translation memories (for example, in MLTR 2.0) which allow non-exact (less than 100%) matching in the database and Natural Language Processing (NLP).

Here, the abbreviation detection and mapping procedure utilizes the following:
a) a list of query segments for a specific language (e.g., such test sets were created for the English and German languages); and
b) a database with possible translations and a MLTR 2.0's retrieval procedure allowing for the possibility of not-exact matching.

The illustration of the abbreviation detection and mapping technique is now illustrated. First, a list of synonyms and their possible abbreviations are obtained using the MLTR 2.0 retrieval procedure featuring non-exact match.

The instant embodiment recognizes that a sorted-by-usage count list of translation proposals may be obtained by sending a given string as a database query and applying not-exact-match such as fuzzy search. Such a sorted-by-usage count list usually contains both full strings and abbreviations.

Moreover, many of these abbreviations are shortened forms of the full length terms in that same list of translation proposals. This is because the number of the possible translations for the given term, is typically limited.

Figure 5:
FIG. 5 shows an example of a retrieval call configuration.

FIG. 5 shows an example of a MLTR 2.0 retrieval call configuration. This illustrates:
sending a source text "Apply" to the MLTR 2.0 for translation from the source language of English to the target language of German (en-EN->de-DE), applying "conditional" search mode with minimal Fuzzy Search score 0.75, and limiting the number of translation proposals to ten.

Sending this retrieval call results in the list of translation proposals shown in FIG. 6. These translation proposals are sorted by similarity score and usage count.

It is initially noted that for the particular list of translation proposals in FIG. 6, each exhibits a similarity "score" value of 1.000. This indicates an exact match. However, exact matching is not required, and for embodiments utilizing non-exact matching the similarity "score" value could lie within a given range. Changing a threshold similarity "score" value for non-exact matching, could allow tailoring the scope of the list of translation proposals that are returned by the human language translation service.

It is also noted that the English language term "Apply" appears in the list of translation proposals. This may reflect previous errors by users who inadvertently approved a non-translated result.

It is further noted that full strings appear at the top of the list of FIG. 6. This is because in most cases, it has been recognized that the strings with the highest usage count are not abbreviations.

It is also noted that abbreviations also occur in the list of FIG. 6. Those abbreviations usually appear at the end of the list of translation proposals, because their usage count is lower.

It is further noted that many of the abbreviations in the list of translation proposals, have corresponding full strings that are also present in the list. This is because there is a limited number of translations for the given word.

The instant example of FIG. 6 shows a common case where the list of proposed translations includes both full strings and abbreviations. Of course, situations may arise where a list of only abbreviations are available. Conversely, other situations may arise where no abbreviations at all or no corresponding full strings appear in the list of translation proposals.

However, such situations arise relatively infrequently. They should not affect the overall usefulness of abbreviation detection that is implemented according to various embodiments.

Moreover, in order to limit the number of such uncommon situations, when the list of the translation proposals does not contain the pairs of full words and abbreviations, the retrieval procedure can be adjusted. In one example, the retrieval procedure could be adjusted by increasing:

the total number of entries allowed for the translation proposal list, and/or a threshold range of the non-exact similarity search score.

Summarizing: a result of this first phase in the abbreviation detection procedure is a list of translation proposals provided by a language translation capability. This list of translation proposals can be understood as a list of synonyms and their abbreviations.

Now, in a second phase of abbreviation detection, rule-based techniques are applied to the translation proposal list in order to detect possible abbreviations. In this manner, every string appearing in the list of translation proposals is checked to detect possible abbreviations.

Exemplary rules for abbreviation detection in this second phase, can include but are not limited to:

check for having a camel case, check for ending with a period, check for having several consonants in a sequence.

If one or more of the conditions set forth by the ruleset are satisfied, the string is marked as a probable abbreviation.

FIG. 7 shows the list of translation proposals evaluated according to a ruleset. As a result, the following two candidates for abbreviations are determined:

"Übn." (note the presence of concluding period), and

"Anwdn" (note the series of consecutive consonants).

Lastly, in a third phase according to this exemplary embodiment, possible abbreviation candidates are mapped with full text strings having a highest usage count. Thus, the inherent user judgment reflected by frequency (popularity) of referring to a particular full string term during system operation, can be leveraged in order to increase the accuracy of mapping of an abbreviation candidate to its corresponding full term.

For all data, a threshold usage count is determined. For example, strings with usage count higher than "5" may be strings corresponding to the original full terms.

According to this third (mapping) phase, abbreviation candidates from the second phase, are compared with the strings in a list having a usage count higher than a threshold.

An edit distance score may be employed as one possible comparison metric. Such a score shows the difference between two given strings.

The following table shows comparison results for the abbreviation candidate "Übn.", as calculated using a Levenshtein distance score FuzzyWuzzy library.

| Frequently Occurring Full String | Standard Levenshtein Distance |
|---|---|
| Übernehmen | 43 |
| Anwenden | 17 |
| Beantragen | 14 |
| Übern | 67 |
| Apply | 0 |
| Bewerben | 33 |
| Zuweisen | 17 |

Here, the highest matches were with: "Übern" (score 67) and "Übernehmen" (score 43).

It is noted that FIG. 7 allows for the possibility of false outcomes in the comparison list. This may be resolved by choosing the longest version of the matches as a result.

So, in the above table the longest result suing is "Übernehmen", and hence that full term is chosen over the (higher scoring but shorter) "Übern". The outcome is an accurate mapping to the original full term encoding for the abbreviation "Übn.".

"Übn."->"Übernehmen".

It is further noted that certain abbreviation candidates may be identified as not appropriate for mapping. For example, as shown in FIG. 7 further resources may not be allocated in an effort to further map the common abbreviation candidate "OK", owing to its ubiquity and lack of informational content.

Returning now to the abbreviation candidates of FIG. 7, "Anwdn" is the second listed probable abbreviation candidate. Performing the third (mapping) phase for this abbreviation candidate results in the following table.

| Frequently Occurring Full String | Standard Levenshtein Distance |
|---|---|
| Übernehmen | 25 |
| Anwenden | 71 |
| Beantragen | 25 |
| Übern | 18 |
| Apply | 18 |

| Frequently Occurring Full String | Standard Levenshtein Distance |
|---|---|
| Bewerben | 14 |
| Zuweisen | 14 |

"Anwdn."->"Anwenden", is an accurate and correct mapping of the abbreviation to the full original term.

As a result of performing abbreviation detection and mapping according to this exemplary embodiment, the full original term correspondent to the abbreviation may be accurately provided even for challenging cases. This result is obtained utilizing resources (e.g., language translation, comparison) that are already-existing and available with little additional cost.

The above example reflects the use of a standard Levenshtein distance for determining similarity between strings as part of the mapping to the full term. However, this is not required and other comparison metrics can be used.

With reference to non-exact matching utilizing the FuzzyWuzzy library, for example, relevant comparison metrics can include but are not limited to:
standard Levenshtein distance;
set Levenshtein distance;
sort Levenshtein distance;
wratio score.

Of course, a wide variety of other comparison metrics (not limited even to edit distance or variations thereof) may be used for abbreviation detection and mapping. Various comparison metrics can be evaluated for a specific use case. Then, the most accurate working variant can be applied.

The process of creating the full terms for abbreviations may be a one-time process. The full term for the abbreviation can be saved in the database in a separate column. In this exemplary embodiment, that separate column is shown as the "textFull" column 408 of FIG. 4B.

If a human is included in the loop to confirm that the proposed full term is correct for the abbreviation, the labeled data will be gathered. A Machine Learning (ML) approach can be used to check if the proposed mapping of the abbreviation to the full original term, can be placed into the database.

Embodiments offer a solution to the challenge of detecting abbreviations and mapping them to their full terms in the course of language processing. Embodiments may solve the problem by leveraging existing resources (e.g., human language translation, non-exact matching, distance scoring) that may already be available.

The availability of mapped original full string terms for abbreviations afforded by embodiments, may significantly increase the incidence of data re-usage for translation processes. And, the performance of existing procedures (e.g., Retrieval or Neural Machine Translation) may be improved due to the increased corpus of available accurate data including translations. This can accordingly reduce cost to SAP.

While FIG. 1 shows the abbreviation mapping engine as being separate and outside of the translation database, this is not required. According to alternative embodiments, the abbreviation mapping engine could be an in-memory database engine (e.g., of the in-memory database storing the translation data). Such embodiments could leverage the processing power of an in-memory database (e.g., the SAP S/4 HANA in-memory database available form SAP SE of Walldorf, Germany), in order to perform various abbreviation detection and mapping functions.

Figure 8:
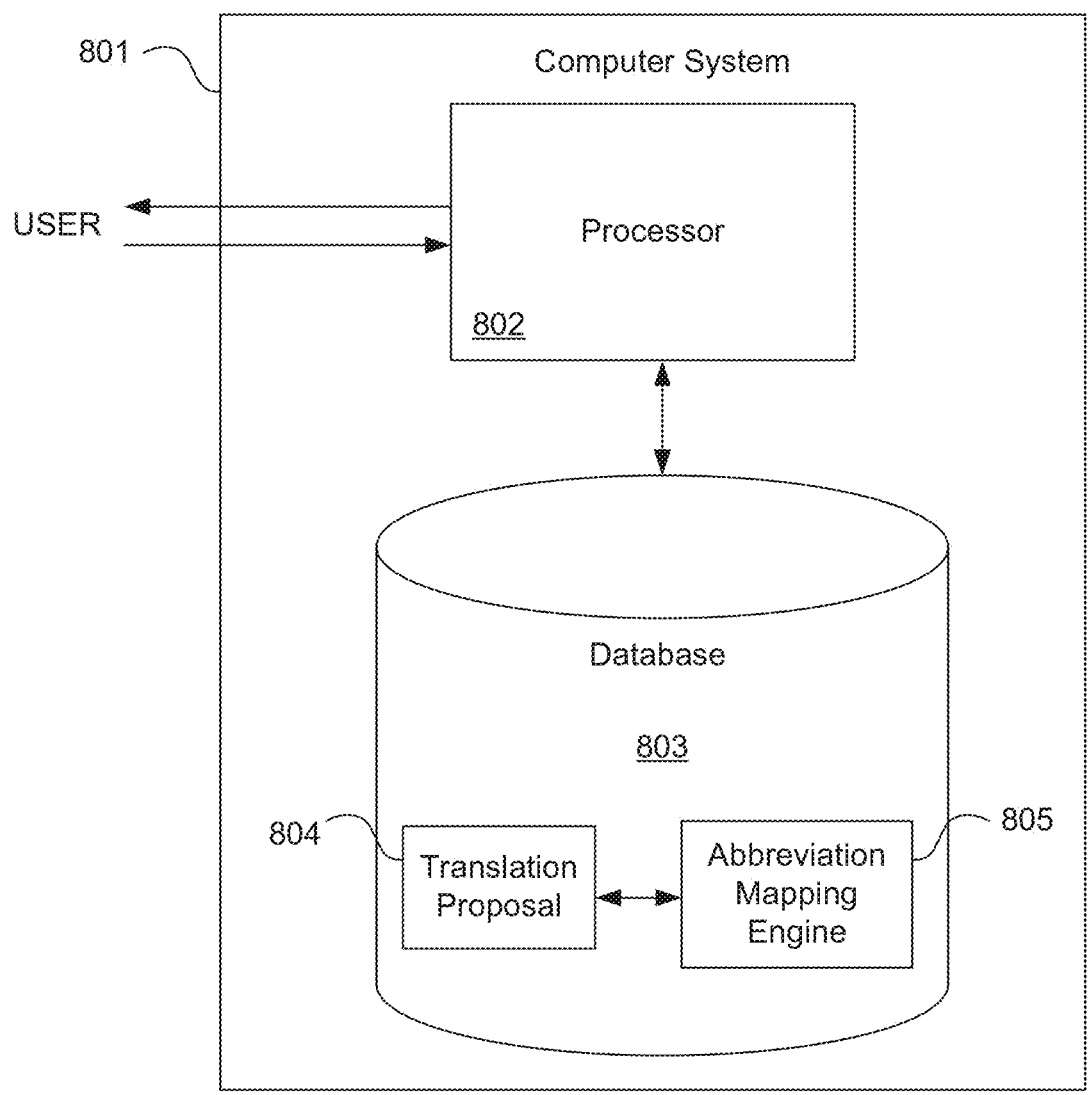
FIG. 8 illustrates hardware of a special purpose computing machine according to an embodiment that is configured to implement abbreviation detection and normalization.

FIG. 8 illustrates hardware of a special purpose computing machine configured to perform as a central event catalog according to an embodiment. In particular, computer system 801 comprises a processor 802 that is in electronic communication with a non-transitory computer-readable storage medium comprising a database 803. This computer-readable storage medium has stored thereon code 805 corresponding to an abbreviation mapping engine. Code 804 corresponds to a translation proposal. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 9:
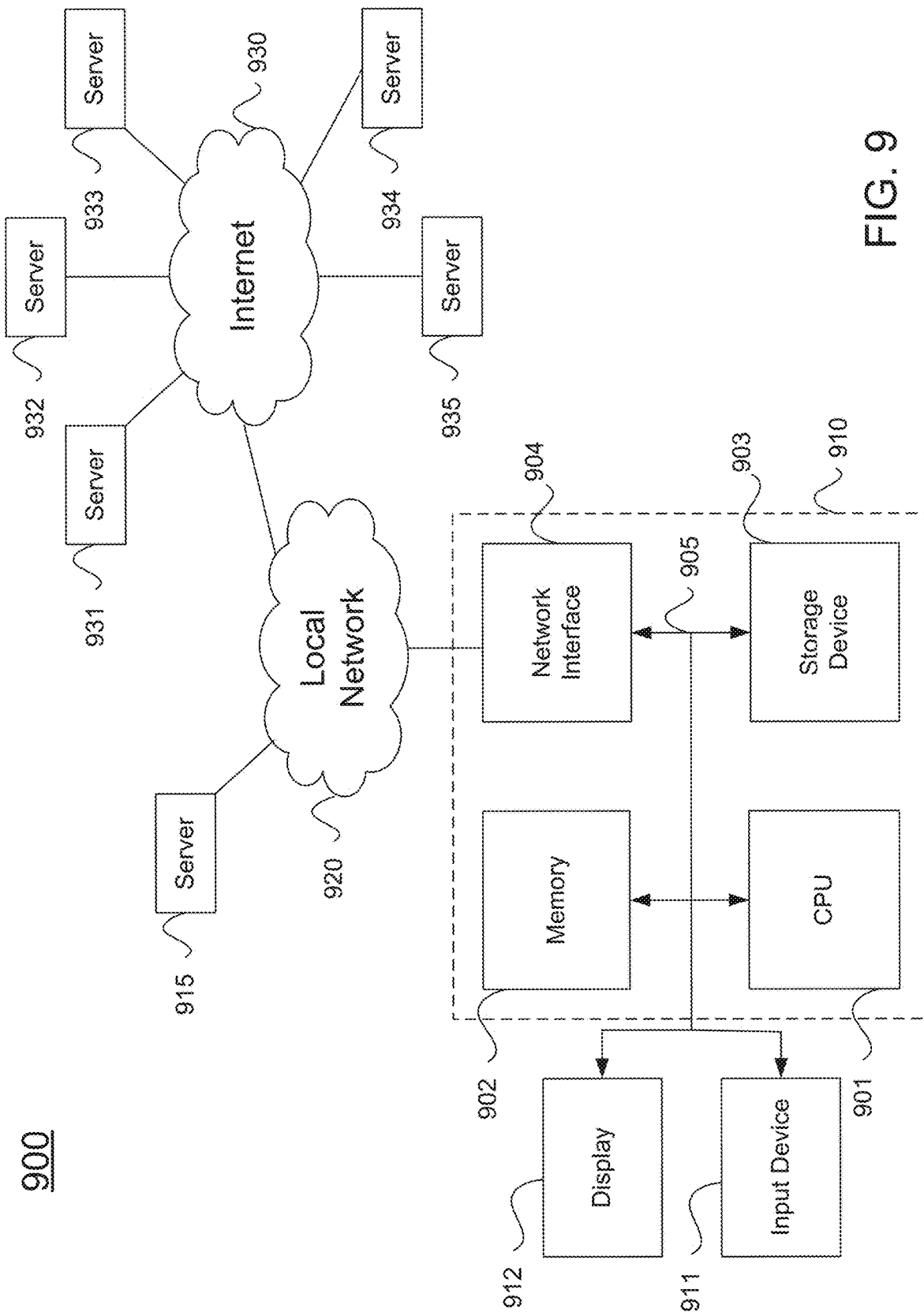
FIG. 9 illustrates an example computer system.

An example computer system 900 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a Light Emitting Diode (LED) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

Example 1. Computer implemented system and methods comprising:
receiving an input in a source human language;
providing the input to a human language translation service;
receiving from the human language translation service, a plurality of translation proposals in a target human language different from the source human language;
applying a ruleset to generate a plurality of abbreviation candidates from the plurality of translation proposals;
mapping one of the plurality of abbreviation candidates to a full term based upon non-exact matching referencing a comparison metric; and
storing in a database of a non-transitory computer readable storage medium, a map between the one of the plurality of abbreviation candidates and the full term.

Example 2. The computer implemented system and method of Example 1 wherein the ruleset evaluates whether the plurality of translation proposals:
exhibit a camel case format,
conclude with a period, or
have several consonants in sequence.

Example 3. The computer implemented systems and methods of Examples 1 or 2 wherein the comparison metric comprises an edit distance or a wratio.

Example 4. The computer implemented systems and methods of Examples 1, 2, or 3 wherein the non-exact matching references a fuzzy search library.

Example 5. The computer implemented systems and methods of Examples 1, 2, 3, or 4 wherein the non-exact matching considers a length of the full term.

Example 6. The computer implemented systems and methods of Examples 1, 2, 3, 4, or 5 further comprising further comprising referencing the database including the map for machine learning.

Example 7. The computer implemented systems and methods of Examples 1, 2, 3, 4, 5, or 6 wherein the database comprises an in-memory database and the comparison metric is calculated by an in-memory database engine of the in-memory database.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving an input in a source human language, wherein the input is a text string including one or more abbreviations resulting from a maximum character size imposed on an input field by a user interface;
providing, via an abbreviation mapping engine, the input to a human language translation service;
receiving from the human language translation service, a plurality of translation proposals in a target human language different from the source human language, wherein receiving the plurality of translation proposals further comprises reusing linguistic data that was previously gathered, and wherein the plurality of translation proposals are associated with a usage count and a plurality of similarity scores indicating non-exact matching of the text string with linguistic data stored in a database, and wherein the similarity scores are within a predefined range configured to produce full words and abbreviations in the plurality of translation proposals;
uploading the plurality of translation proposals to the abbreviation mapping engine;
applying, by the abbreviation mapping engine, a ruleset to the plurality of translation proposals to generate a plurality of abbreviation candidates from the plurality of translation proposals, the ruleset detecting one or more of: a camel case, a concluding period, and an occurrence of multiple consonants;
comparing the plurality of abbreviation candidates to translation proposals having the usage count greater than a threshold, wherein said comparing is based on an edit distance between the plurality of abbreviation and to translation proposals;
mapping one of the plurality of abbreviation candidates to a text string corresponding to an original full term based upon the edit distance and a length of one or more translation proposals having edit distances above a threshold; and
storing in a database of a non-transitory computer readable storage medium, a map between the one of the plurality of abbreviation candidates and the original full term.

2. A method as in claim 1 wherein the non-exact matching calculates a wratio as the comparison metric.

3. A method as in claim 1 wherein the non-exact matching references a fuzzy search library.

4. A method as in claim 1 wherein the non-exact matching considers a length of the full term.

5. A method as in claim 1 further comprising referencing the database including the map for machine learning.

6. A method as in claim 1 wherein:
the database comprises an in-memory database; and
an in-memory database engine of the in-memory database calculates the comparison metric.

7. A method as in claim 1 wherein the mapping further includes choosing the full term in the target human language based on a length of the full term and the comparison metric.

8. A non-transitory computer readable storage medium embodying a computer program for performing a method, said method comprising:
receiving an input in a source human language, wherein the input is a text string including one or more abbreviations resulting from a maximum character size imposed on an input field by a user interface;
providing, via an abbreviation mapping engine, the input to a human language translation service;
receiving from the human language translation service, a plurality of translation proposals in a target human language different from the source human language, wherein receiving the plurality of translation proposals further comprises reusing linguistic data that was previously gathered, and wherein the plurality of translation proposals are associated with a usage count and a plurality of similarity scores indicating non-exact matching of the text string with linguistic data stored in a database, and wherein the similarity scores are within a predefined range configured to produce full words and abbreviations in the plurality of translation proposals;

uploading the plurality of translation proposals to the abbreviation mapping engine;

applying, by the abbreviation mapping engine, a ruleset to the plurality of translation proposals to generate a plurality of abbreviation candidates from the plurality of translation proposals, the ruleset detecting one or more of: a camel case, a concluding period, and an occurrence of multiple consonants;

comparing the plurality of abbreviation candidates to translation proposals having the usage count greater than a threshold, wherein said comparing is based on an edit distance between the plurality of abbreviation and to translation proposals;

mapping one of the plurality of abbreviation candidates to a text string corresponding to an original full term based upon non the edit distance and a length of one or more translation proposals having edit distances above a threshold; and storing in a database of a non-transitory computer readable storage medium, a map between the one of the plurality of abbreviation candidates and the original full term.

9. A non-transitory computer readable storage medium as in claim 8 wherein the non-exact matching references a fuzzy search library.

10. A non-transitory computer readable storage medium as in claim 8 wherein the method further comprises referencing the database including the map for machine learning.

11. A non-transitory computer readable storage medium as in claim 8 wherein the plurality of translation proposals is limited to a maximum number.

12. A non-transitory computer readable storage medium as in claim 8 wherein a number of the plurality of translation proposals is limited by a minimum usage count.

13. A computer system comprising:
one or more processors;
a software program, executable on said computer system, the software program configured to cause an in-memory database engine of an in-memory source database to:
receive an input in a source human language, wherein the input is a text string including one or more abbreviations resulting from a maximum character size imposed on an input field by a user interface;

provide, via an abbreviation mapping engine, the input to a human language translation service;

receive from the human language translation service, a plurality of translation proposals in a target human language different from the source human language, wherein receiving the plurality of translation proposals further comprises reusing linguistic data that was previously gathered, and wherein the plurality of translation proposals are associated with a usage count and a plurality of similarity scores indicating non-exact matching of the text string with linguistic data stored in a database, and wherein the similarity scores are within a predefined range configured to produce full words and abbreviations in the plurality of translation proposals;

upload the plurality of translation proposals to the abbreviation mapping engine;

apply, by the abbreviation mapping engine, a ruleset to the plurality of translation proposals to generate a plurality of abbreviation candidates from the plurality of translation proposals, the ruleset detecting one or more of: a camel case, a concluding period, and an occurrence of multiple consonants;

compare the plurality of abbreviation candidates to translation proposals having the usage count greater than a threshold, wherein said comparing is based on an edit distance between the plurality of abbreviation and to translation proposals;

map one of the plurality of abbreviation candidates to a text string corresponding to an original full term based upon non the edit distance and a length of one or more translation proposals having edit distances above a threshold; and store in a database of a non-transitory computer readable storage medium, a map between the one of the plurality of abbreviation candidates and the original full term.

14. A computer system as in claim 13 wherein the ruleset evaluates whether the plurality of translation proposals have several consonants in sequence.

15. A computer system as in claim 13 wherein the in-memory database engine is further configured to reference the database including the map for machine learning.

16. A computer system as in claim 13 wherein the non-exact matching references a fuzzy search library.

17. A computer system as in claim 13 wherein the mapping further includes choosing the full term in the target human language based on a length of the full term and the comparison metric.

* * * * *